(12) United States Patent  (10) Patent No.: US 9,140,492 B1
Gunsaullus  (45) Date of Patent: Sep. 22, 2015

(54) PAINT DISPOSAL OR RECOVERY SYSTEM

(76) Inventor: Scott E. Gunsaullus, Itasca, IL (US)

( * ) Notice: Subject to any disclaimer, the term of this patent is extended or adjusted under 35 U.S.C. 154(b) by 2116 days.

(21) Appl. No.: 12/143,997

(22) Filed: Jun. 23, 2008

(51) Int. Cl.
  F26B 5/00   (2006.01)
  F26B 9/06   (2006.01)
  F26B 9/00   (2006.01)
  F26B 21/00  (2006.01)

(52) U.S. Cl.
  CPC . F26B 5/00 (2013.01); F26B 9/003 (2013.01); F26B 9/066 (2013.01); F26B 21/004 (2013.01)

(58) Field of Classification Search
  CPC ............ F26B 5/00; F26B 9/003; F26B 9/066; F26B 21/004; F26B 25/06; F26B 25/14
  USPC ............. 34/94, 202, 218, 235, 305, 518, 192; 34/194, 209, 211; 229/117.12, 117.29, 229/120, 908, 916, 929; 206/204; 220/495.02, 495.04
  See application file for complete search history.

(56) References Cited

U.S. PATENT DOCUMENTS

| | | | | |
|---|---|---|---|---|
| 693,163 | A * | 2/1902 | Seavey | 34/211 |
| 1,504,854 | A * | 8/1924 | Baker | 34/194 |
| 2,615,613 | A * | 10/1952 | Reeser | 229/117.13 |
| 3,691,736 | A * | 9/1972 | Neumann | 55/484 |
| 3,874,499 | A * | 4/1975 | Barnett, Jr. | 206/1.7 |
| 3,950,294 | A | 4/1976 | Connelly et al. | |
| 4,096,061 | A | 6/1978 | Brennan | |
| 4,872,270 | A | 10/1989 | Fronheiser et al. | |
| 5,236,506 | A * | 8/1993 | Mazakas | 118/634 |
| 5,244,499 | A * | 9/1993 | Mazakas | 118/309 |
| 5,299,362 | A | 4/1994 | Baldinger | |
| 5,496,404 | A | 3/1996 | Price et al. | |
| 5,765,293 | A | 6/1998 | St. Louis et al. | |
| 6,035,545 | A | 3/2000 | Jones | |
| 6,035,551 | A | 3/2000 | Scheufler et al. | |
| 6,126,067 | A * | 10/2000 | Grigsby et al. | 229/120 |
| 6,151,910 | A * | 11/2000 | Hazen | 62/457.2 |
| 6,162,270 | A * | 12/2000 | Nystrom et al. | 55/385.2 |
| 6,203,859 | B1 | 3/2001 | Scheufler et al. | |
| 6,242,046 | B1 | 6/2001 | Nakane et al. | |
| 6,311,410 | B1 | 11/2001 | Heikkila et al. | |
| 6,311,906 | B1 | 11/2001 | Kim | |
| 6,578,758 | B1 * | 6/2003 | Grigsby et al. | 229/120 |
| 6,776,364 | B2 | 8/2004 | Sonehara et al. | |
| 6,826,850 | B2 * | 12/2004 | Jewell | 34/222 |
| 2002/0004994 | A1 | 1/2002 | Rudd | |
| 2003/0226275 | A1 * | 12/2003 | Becke | 34/181 |

FOREIGN PATENT DOCUMENTS

| | | | | |
|---|---|---|---|---|
| JP | 56-091883 | A * | 7/1981 | B09B 3/00 |
| JP | 08252083 | A * | 10/1996 | |
| JP | 2002147958 | A2 | 5/2002 | |

* cited by examiner

*Primary Examiner* — Jiping Lu
(74) *Attorney, Agent, or Firm* — Mathew R. P. Perrone, Jr.

(57) ABSTRACT

A paint disposal or recovery system, which efficiently places the paint in layers and evaporates the water therefrom, permits efficient disposal or efficient recovery of the solid material or the formerly dispersed material. Layers of water-based paints are especially formed on vapor permeable surfaces in trays or on the Surface of a supported, vapor permeable pocket liner. The trays with the liner thereon or the supported pocket liner is then placed in dryer housing. Air or other drying agents are then forced through the dryer housing. The water evaporates and leaves the dispersed material from the water-based paint on the respective surface.

3 Claims, 13 Drawing Sheets

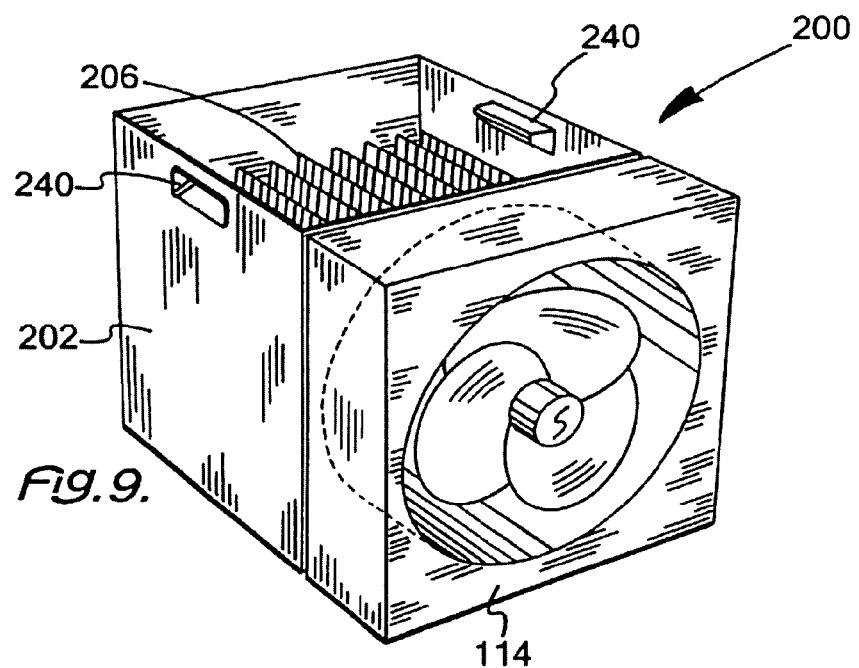
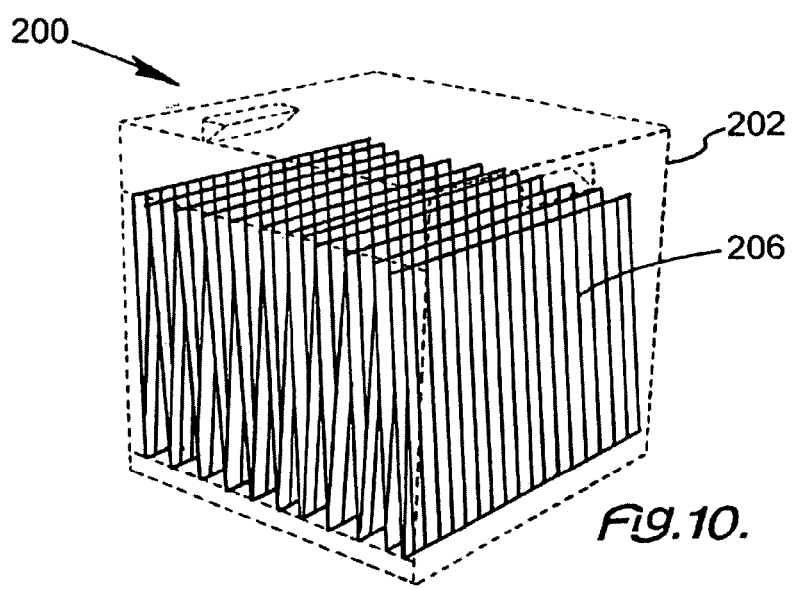

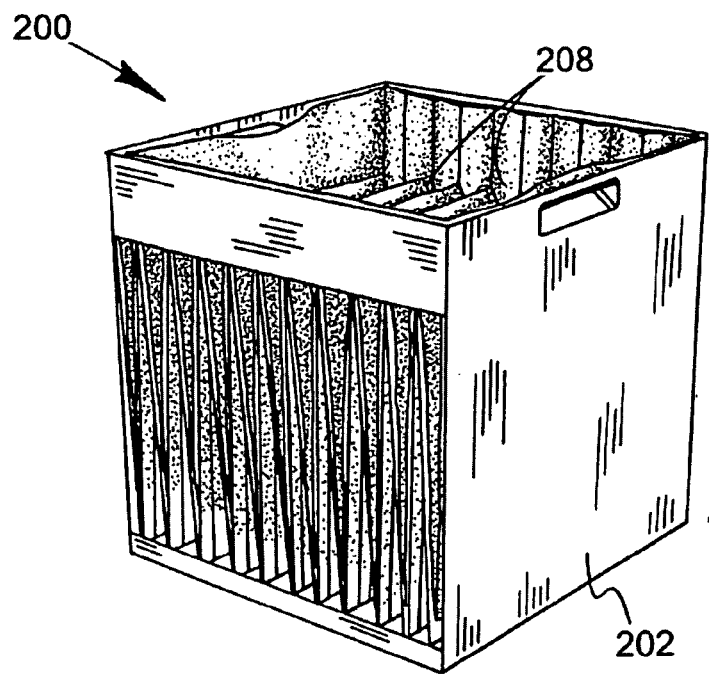
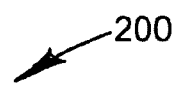
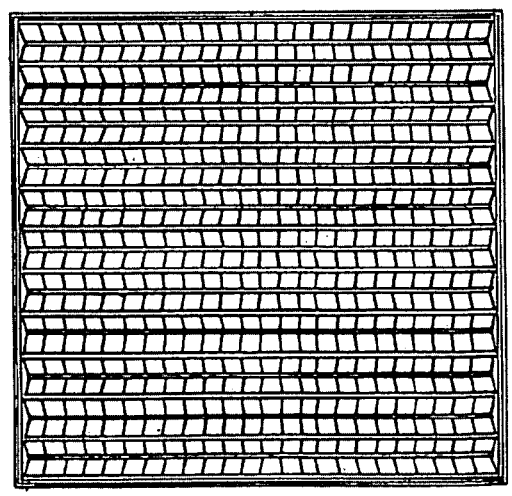

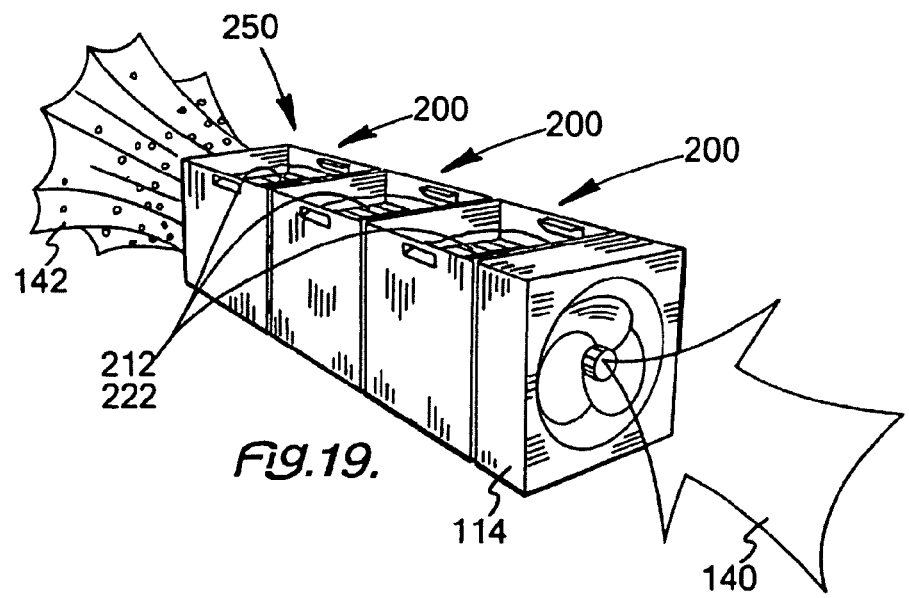
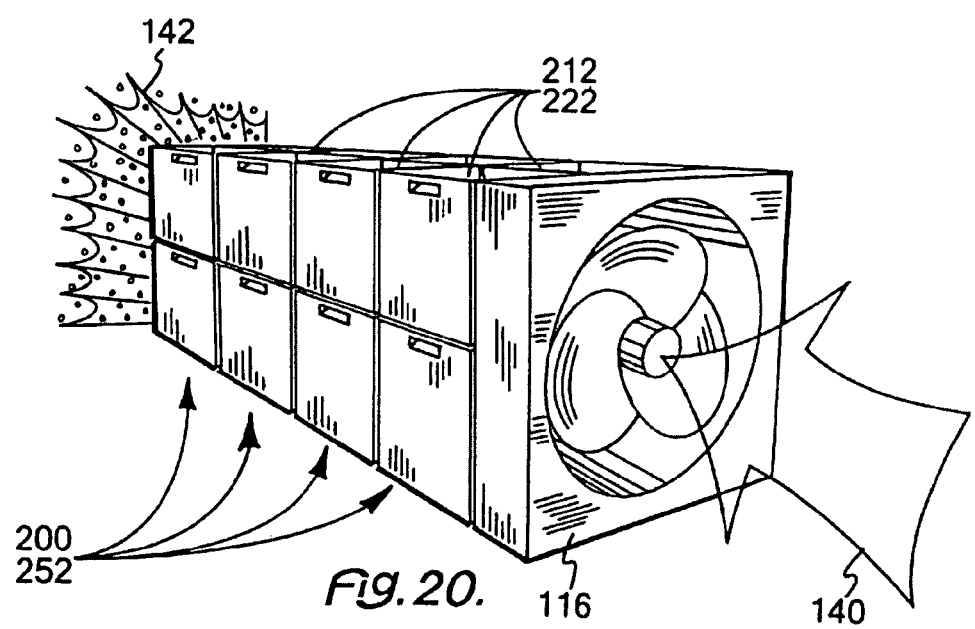

US 9,140,492 B1

PAINT DISPOSAL OR RECOVERY SYSTEM

This invention relates to a paint disposal or recovery system and more particularly to a paint disposal or recovery system for water-based paint system, which removes the water and permits recovery of solids in the paint.

BACKGROUND OF THE INVENTION

Proper disposal of paint is a critical feature for the environment. The contents of the paint cause many problems with the environment. In an effort to reduce the pollution from paint, water-based paints are known. Even with this improvement, disposal still is a problem.

Water-based paints generally contain polymers and pigments, which polymers and pigments are dispersed, in water. This dispersion is applied to a desired surface. As the water evaporates, the dispersed polymers and pigments are left on the surface and give appearance of a proper coating.

The water and other content of the paints can still cause environmental problems. Such paint cannot just be sent to land fills or poured down the sewer without causing major problems. To that end, a better disposal method is required, even for the water-based paint.

Recovery or reuse of at least part of the water-based paint is even better for the environment than the most efficient disposal method. The effective use of materials is very desirable and even more useful than the most efficient disposal method. Therefore, reusing or reprocessing paint materials offers great advantages. Yet no such system exists.

SUMMARY OF THE INVENTION

Among the many objectives of the present invention is the provision of a paint disposal or recovery system.

Another objective of the present invention is the provision of a paint disposal or recovery system, with reduced environmental problems.

Yet another objective of the present invention is the provision of a paint disposal or recovery system, with reduced landfill problems.

Still, another objective of the present invention is the provision of a paint disposal or recovery system, with recovery of some ingredients.

Also, an objective of the present invention is the provision of a paint disposal or recovery system, with reduced space requirements.

These and other objectives of the invention (which other objectives become clear by consideration of the specification, claims and drawings as a whole) are met by providing a paint disposal or recovery system, which efficiently places the paint in layers on a vapor permeable surface, which is mounted on a support surface, and evaporates the water therefrom, to permit disposal solids in the water-based paint or recovery from water-based paint of the solid material or the formerly dispersed material.

BRIEF DESCRIPTION OF DRAWINGS

FIG. 9 depicts a perspective view of waste paint dryer 200 of this invention.

FIG. 10 depicts a perspective view of a liner support rack 206 for waste paint dryer 200 of this invention, rotated 90 degrees about a vertical axis based on FIG. 9.

FIG. 13 depicts a reverse perspective view of a vapor permeable, multi pocket liner 208 for liner support rack 206 for waste paint dryer 200 of this invention based on FIG. 11.

FIG. 14 depicts a bottom plan view of the waste paint dryer 200.

FIG. 19 depicts a perspective view of the waste paint dryer 200 of this invention, in use.

FIG. 20 depicts a perspective of the waste paint dryer 200 of this invention, in use.

Throughout the figures of the drawings, where the same part appears in more than one figure of the drawings, the same number is applied thereto.

DESCRIPTION OF THE PREFERRED EMBODIMENTS

Figure 1:
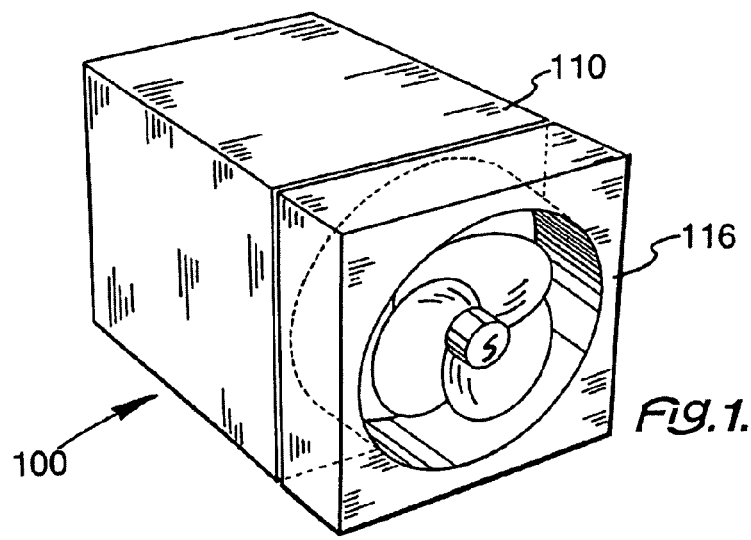
FIG. 1 depicts a perspective view of the tray paint dryer 100 of this invention.
Figure 2:
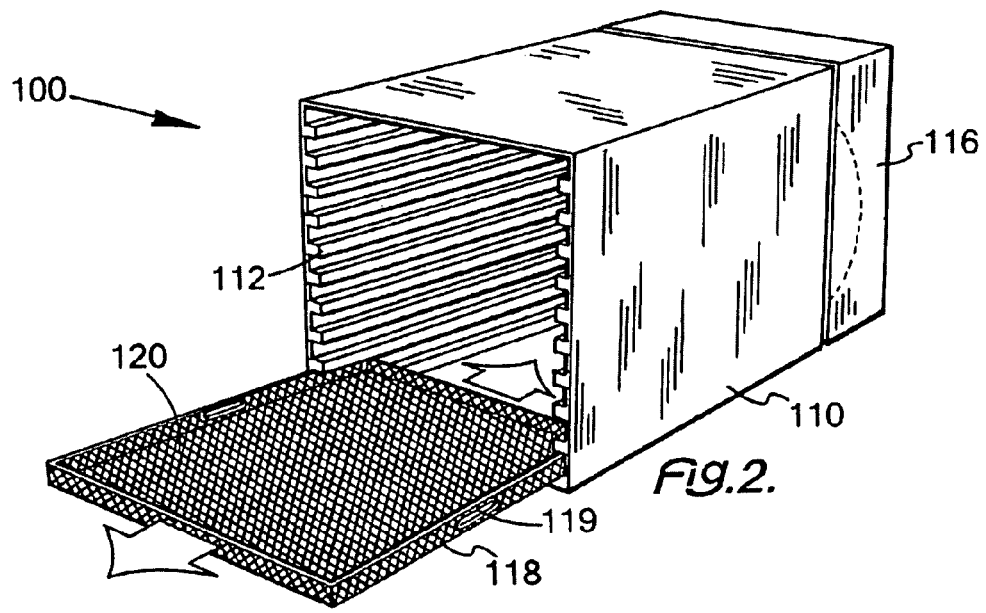
FIG. 2 depicts a reverse perspective view of the tray paint dryer 100 of this invention, based on FIG. 1.
Figure 3:
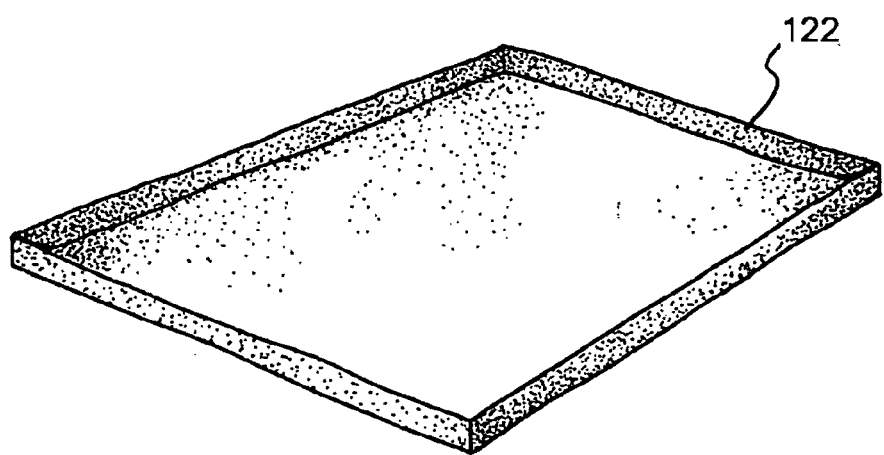
FIG. 3 depicts a perspective view of the vapor permeable tray liner 122 for the tray paint dryer 100 of this invention.
Figure 4:
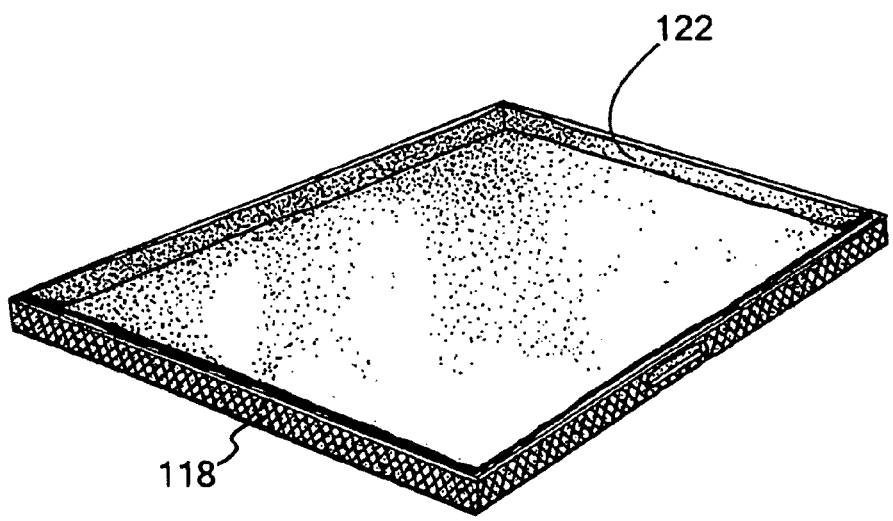
FIG. 4 depicts a perspective view of the vapor permeable tray liner 122 in a dryer tray 118 for the tray paint dryer 100 of this invention.

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the invention in any manner. The words attach, connect, couple, and similar terms with their inflectional morphemes do not necessarily denote direct or intermediate connections, but may also include connections through mediate elements or devices.

The paint disposal or recovery system forms layers of paint on or in contact with a vapor permeable surface or layer. The vapor permeable layer has a support surface. The support surface with the vapor permeable surface thereon is then optionally placed in a drying chamber. Air or another drying agent, serves as an evaporating means, then passes over the layers of paint in or out of the drying chamber and leaves at least one material or dispersed elements on the substrate or vapor permeable surface. Preferably, an air means, such as a fan forces air through the drying chamber. The vapor permeable surface greatly improves the evaporation of the water. While other materials are useful, the vapor permeable surface is generally paper.

However, the vapor permeable substrate may be a vapor permeable substrate capable of being dissolved or pulverized and used with the paint. This is especially true in the event the dried paint is then recycled as paint. Thus, this drying system becomes even more efficient.

From that point, the dispersed elements may be recycled to form more paint or properly submitted to a disposal area or system. Layers of water-based paints are especially formed on vapor permeable surfaces in trays or on the surface of a supported, vapor permeable pocket liner. The trays with the liner thereon or the supported pocket liner is then placed in dryer housing. Air or other drying agents are then forced through the dryer housing. The water evaporates and leaves the dispersed material from the water-based paint on the respective surface.

Referring now to FIG. 1, FIG. 2, FIG. 3 and FIG. 4, the paint disposal or recovery system is depicted in the preferred embodiment as the tray paint dryer 100 of this invention. Tray paint dryer 100 has a dryer housing 110 with a large box fan 116 at one end thereof. In this embodiment, the surface support is dryer tray 118. Dryer housing 110 has matching pairs of tray rungs 112 on either side thereof. Each pair of tray rungs 112 receives a dryer tray 118.

On that dryer tray 118 is a vapor permeable surface in the form of a vapor permeable tray liner 122. Waste paint 212 (as further seen in FIG. 5) is poured on the vapor permeable tray liner 122 on dryer tray 118. This dryer tray 118 is then inserted into dryer housing 110. After dryer housing 110 has a dryer tray 118 on each pair of tray rungs 112, large box fan 116 is used to force air through dryer housing 110, which facilitates the evaporation of water from the waste paint 212.

The dryer tray 118 most preferably includes a series of tray apertures 120 within the dryer tray 118 in order to facilitate evaporation of the water by passing of air through the dryer tray 118 and hence the vapor permeable tray liner 122, which is vapor permeable. With vapor permeable tray liner 122 being vapor permeable, water removal is most efficient.

Dryer tray 118 is formed of a screen like material and easily permits air to pass therethrough. Vapor permeable tray liner 122 closes dryer tray 118 to solids, while permitting gas (air for example) or vapor (water vapor for example) to pass therethrough. This permits loss of water from the waste paint 212, and drying thereof to its solid content. This solid content can now be reused or recycled, subjected to a proper disposal process.

Figure 5:
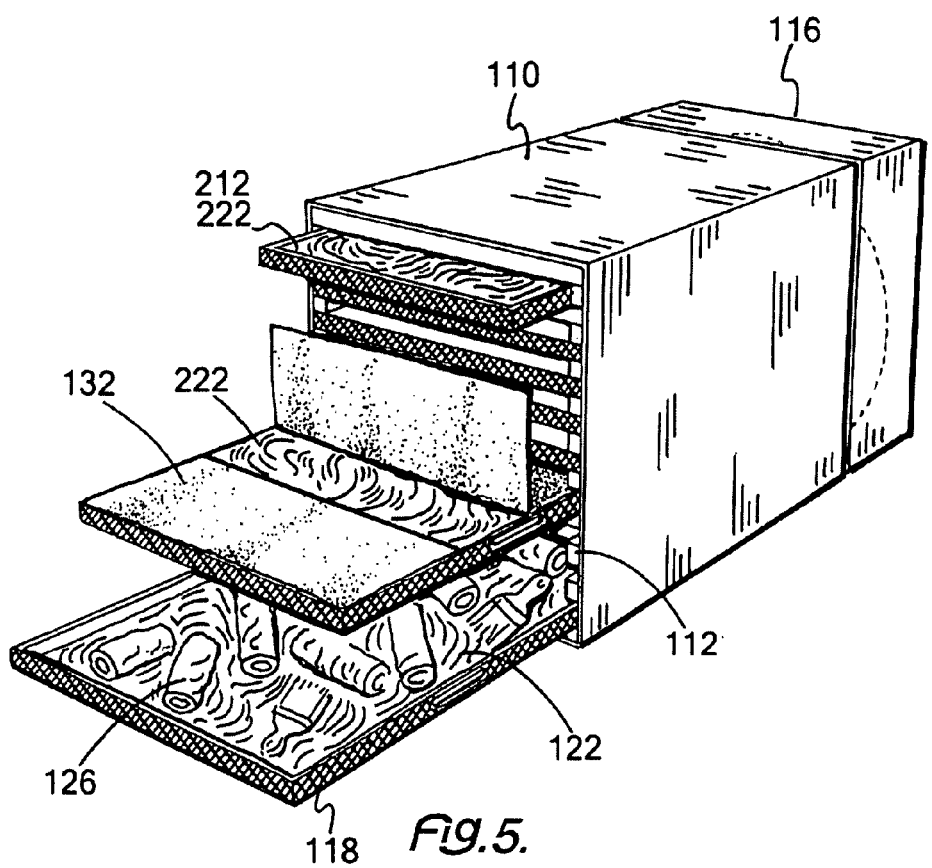
FIG. 5 depicts a reverse perspective view of the tray paint dryer 100 of this invention, based on FIG. 1 containing paint soaked applicators 126, vapor permeable envelop 132 and waste paint 212.

With the further consideration FIG. 5, it is clear that paint soaked applicators 126 may also be dried in tray paint dryer 100. Once dried, paint soaked applicators 126 are more easily subjected to a proper disposal process. Waste paint 212 is dried in tray paint dryer 100. Once poured, waste paint 212 becomes drying paint 222.

Figure 22:
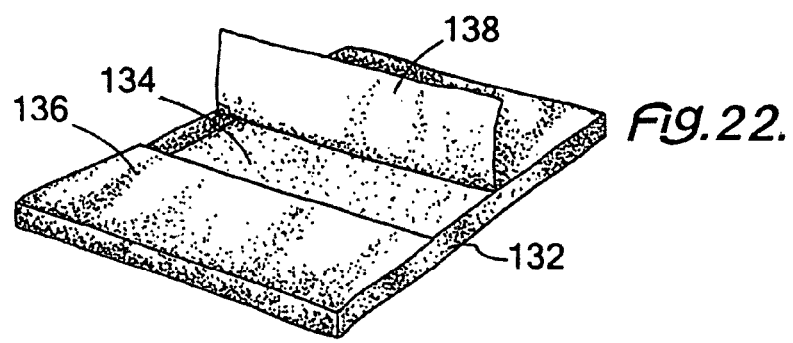
FIG. 22 depicts a perspective view of the vapor permeable envelope 132 for this invention.
Figure 23:
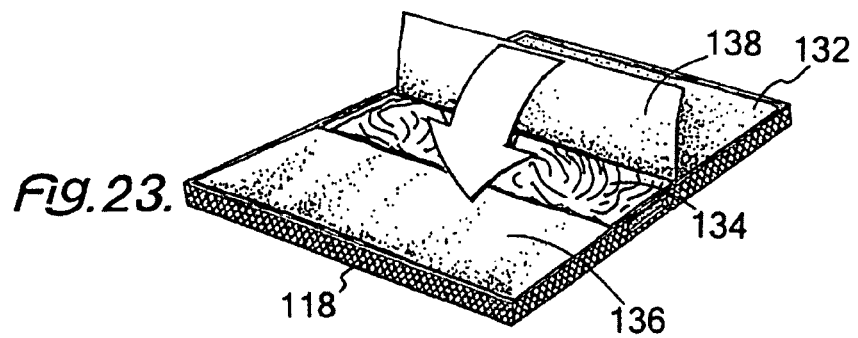
FIG. 23 depicts a perspective view of the vapor permeable envelope 132 on paint tray 118.

In addition to the vapor permeable sheet liner 122, a vapor permeable envelop 132 may be used on dryer tray 118. Envelope 132 (FIG. 22 and FIG. 23) includes a liner cavity 134, to receive waste paint 212 to be dried. While the liner cavity 134 is closeable by the liner top 136, liner top 136 includes a liner flap 138, which is raised to allow access to liner cavity 134 for the waste paint 212.

Figure 6:
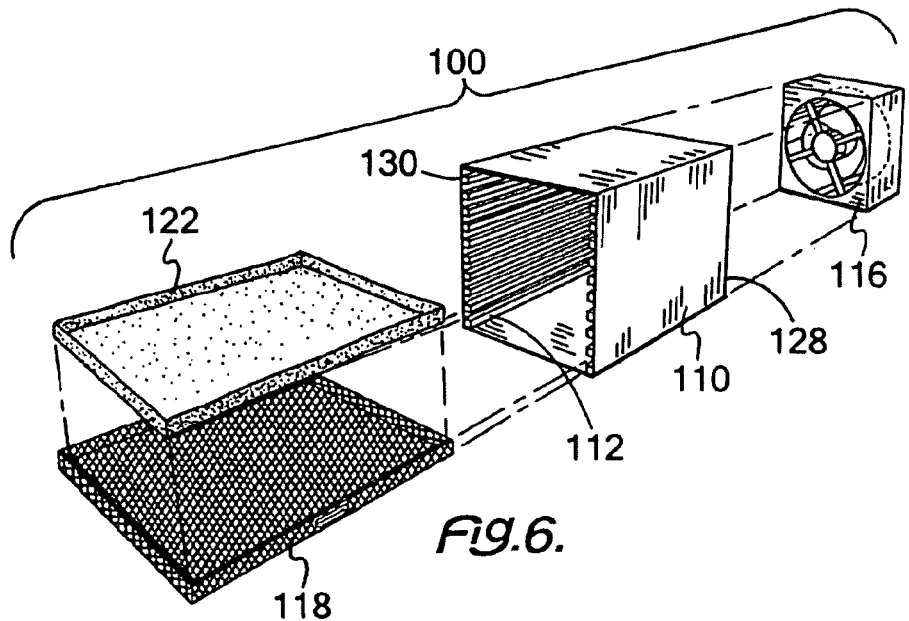
FIG. 6 depicts an exploded prospective view for the tray paint dryer 100 of this invention based on FIG. 2.
Figure 7:
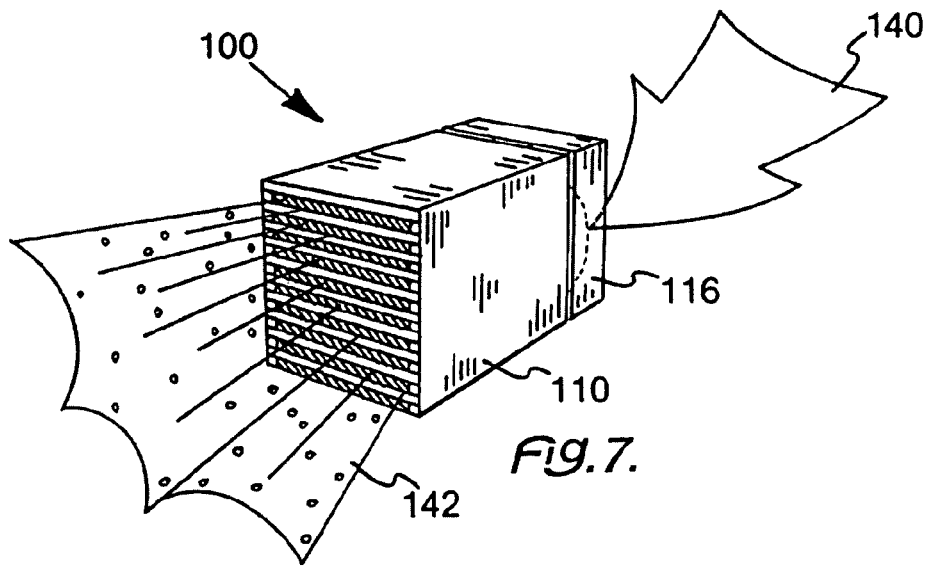
FIG. 7 depicts a perspective view of the tray paint dryer 100 of this invention in use, based on FIG. 2.

Turning now to FIG. 6 and FIG. 7, the use of tray paint dryer 100 becomes even more clear. As vapor permeable tray liner 122 is placed in dryer tray 118, waste paint 212 (as seen in FIG. 5) is poured thereon. The assembled dryer tray 118 is placed on tray rungs 112. Large box fan 116 is then placed adjacent to first open end 128 of dryer housing 110, so that dry air 140 can be forced therethrough and permits moist air 142 to exit dryer housing 110 at opposing open end 130. A paint residue is thus left on vapor permeable tray liner 122 as desired for disposal or reuse.

Figure 8:
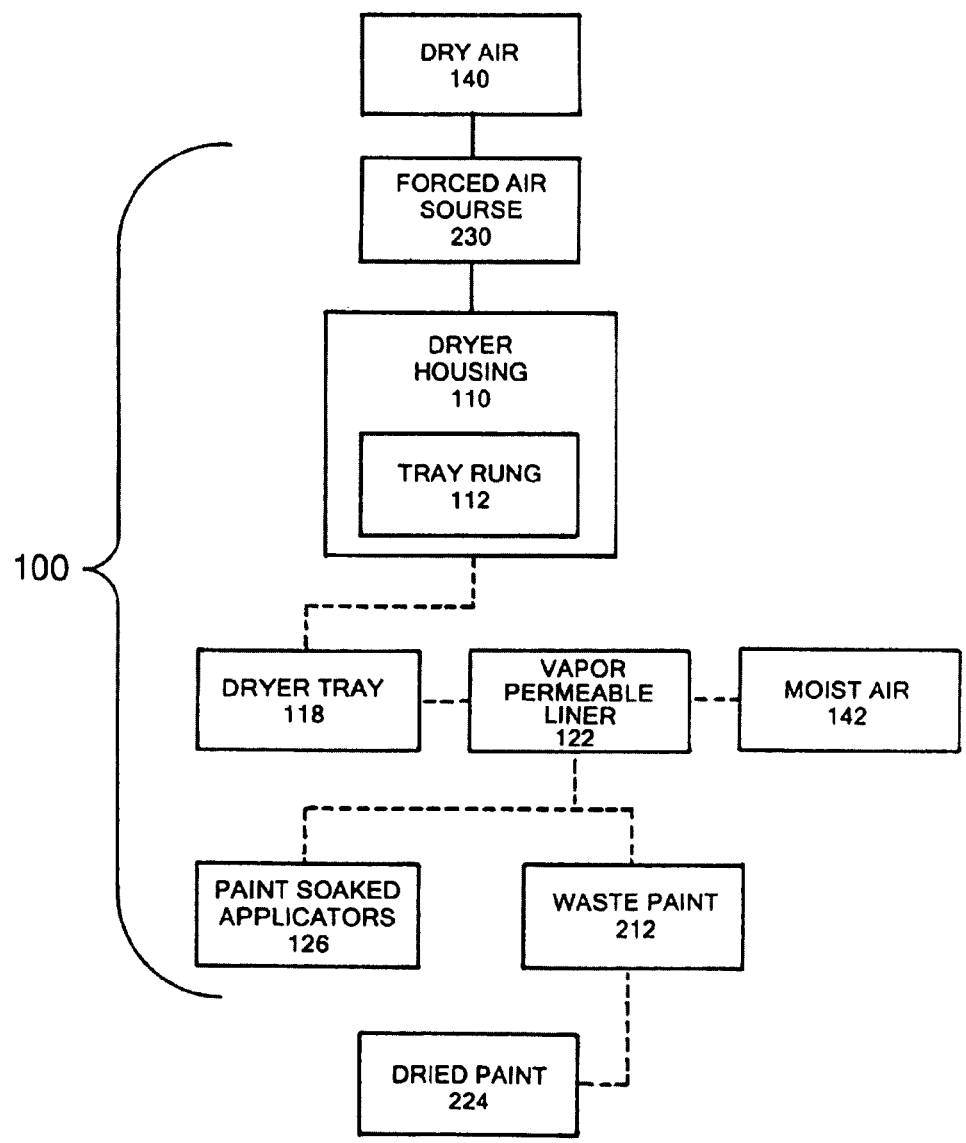
FIG. 8 depicts a detailed box diagram for the tray paint dryer 100 of this invention.
Figure 11:
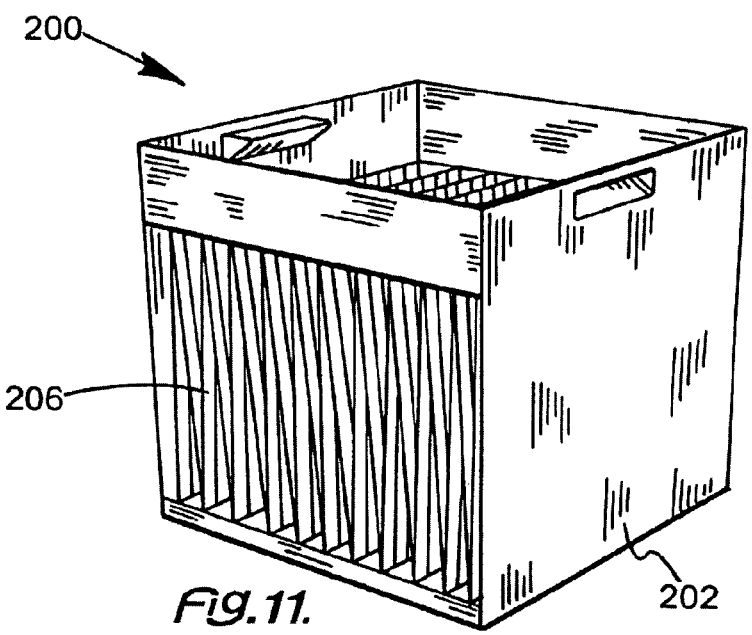
FIG. 11 depicts a reverse, perspective view for the waste paint dryer 200 of this invention based on FIG. 9.
Figure 12:
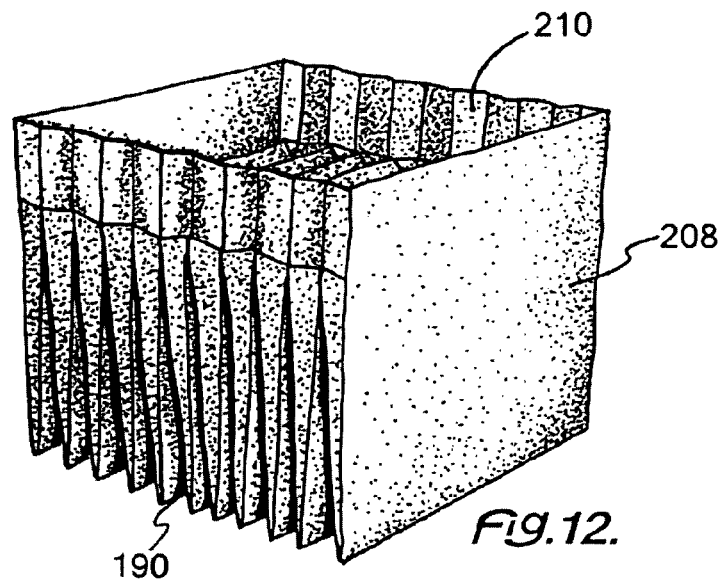
FIG. 12 depicts a perspective view of a vapor permeable, multi pocket liner 208 for liner support rack 206 of waste paint dryer 200 of this invention.
Figure 15:
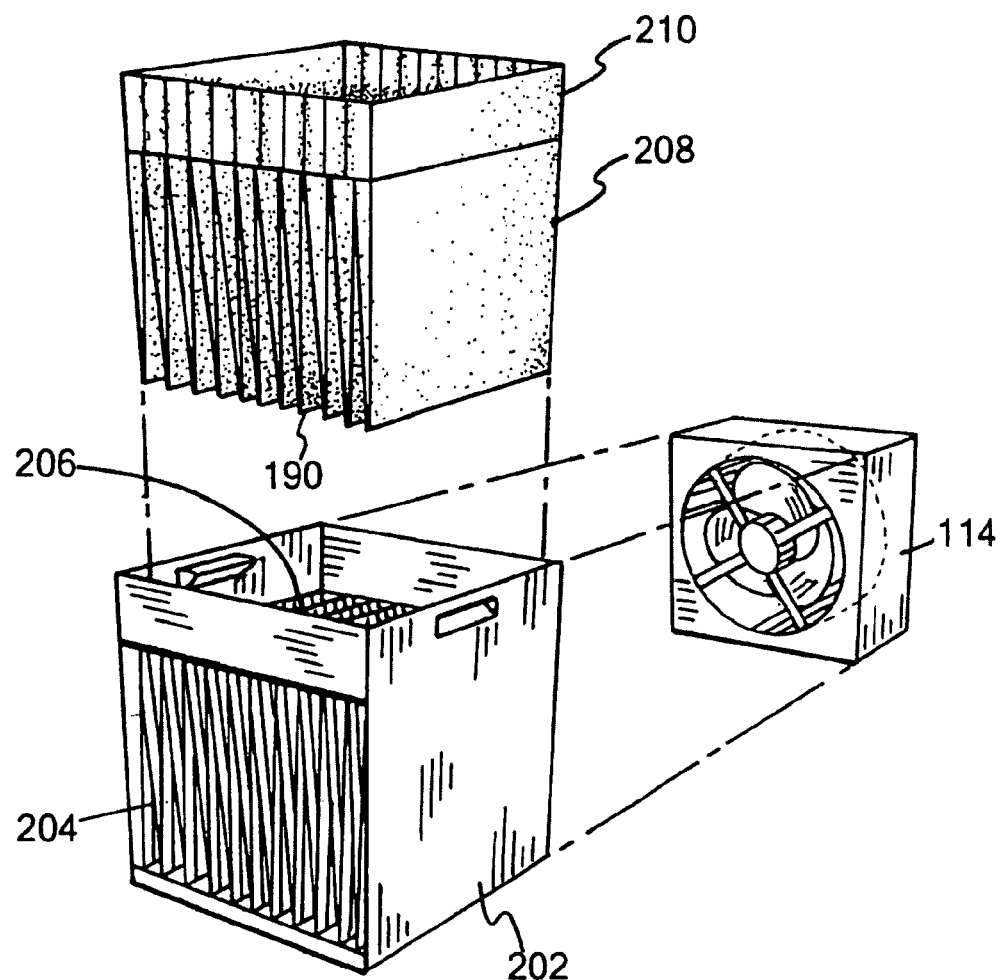
FIG. 15 depicts an exploded, perspective view of the waste paint dryer 200 of this invention.

With FIG. 8, an expanded option for tray paint dryer 100 becomes clear. Dry air 140 is drawn by forced air source 230 over tray rungs 112 in dryer housing 110. With a dryer tray 118 and vapor permeable tray liner 122 on each pair of tray rungs 112, the dry air 140 passes thereover and becomes moist air 142 making paint soaked applicators 126 or waste paint 212 free of water, and permitting recovery of dried paint 224. Dried paint 224 can then be recycled or reformulated, or subjected to proper disposal. Forced air source 230 can be any suitable device which is able to force air through dryer housing 110. In the previous embodiments, forced air source 230 is large box fan 116.

After the above consideration of tray paint dryer 100, FIG. 9, FIG. 10, FIG. 11, FIG. 12, FIG. 13, FIG. 14, and FIG. 15 now show the effectiveness of waste paint dryer 200. Waste paint dryer 200 has a portable base 202. In portable base 202 is a series of base slots 204 for a vapor permeable surface in the form of a liner support rack 206. Liner support rack 206 has a series of base slots 204. Base slots 204 have an accordion arrangement thus allowing space between each base slot 204.

Liner support rack 206 receives vapor permeable, multi-pocket liner 208 with a series of paint slots 190, which provides a vapor permeable liner for each base slot 204 in liner support rack 206. Paint slots 190 are vapor permeable and are also arranged in an accordion alignment. The alternating spaces between base slots 204 accept and support paint slots 190. As paint 212 is poured into vapor permeable, multi-pocket liner 208, it fills each paint slot 190 in the vapor permeable, multi pocket liner 208 as supported and permits efficient drying of the waste paint 212, as air passes thereover.

Small box fan 114 forces air through the combination of portable base 202 and vapor permeable, multi-pocket liner 208 causing waste paint 212 in paint slots 190 to dry as the water evaporates. Vapor permeable, multi-pocket liner 208 includes an upper collar 210 in FIG. 11 and FIG. 12, which facilitates pouring of waste paint 212. Upper collar 210 also extends above paint slots 190, to permit drying of paint soaked applicators 126, such as brushes, rollers and other items, to be dried thereon.

Figure 16:
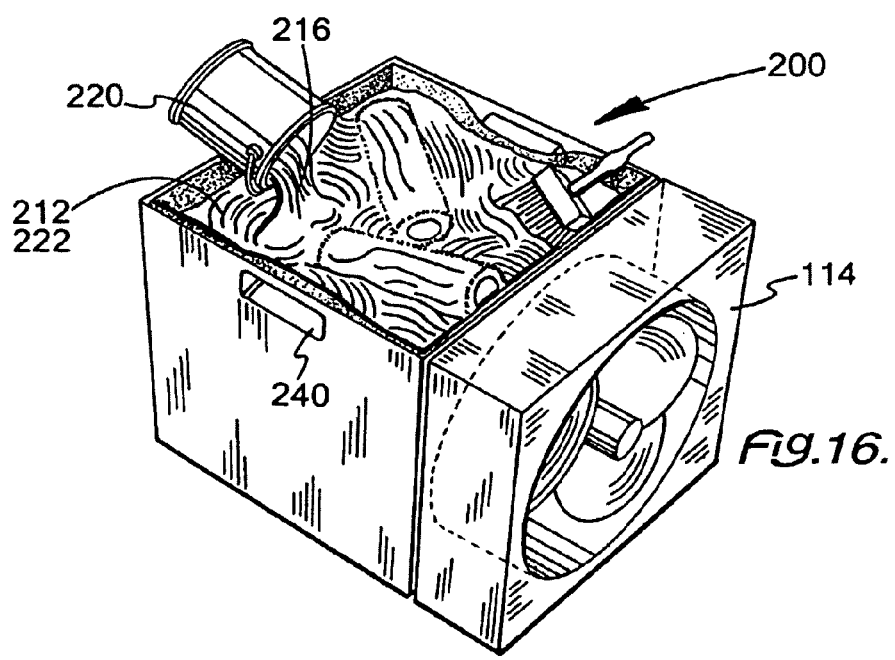
FIG. 16 depicts a perspective of the waste paint dryer 200 of this invention, in use.
Figure 17:
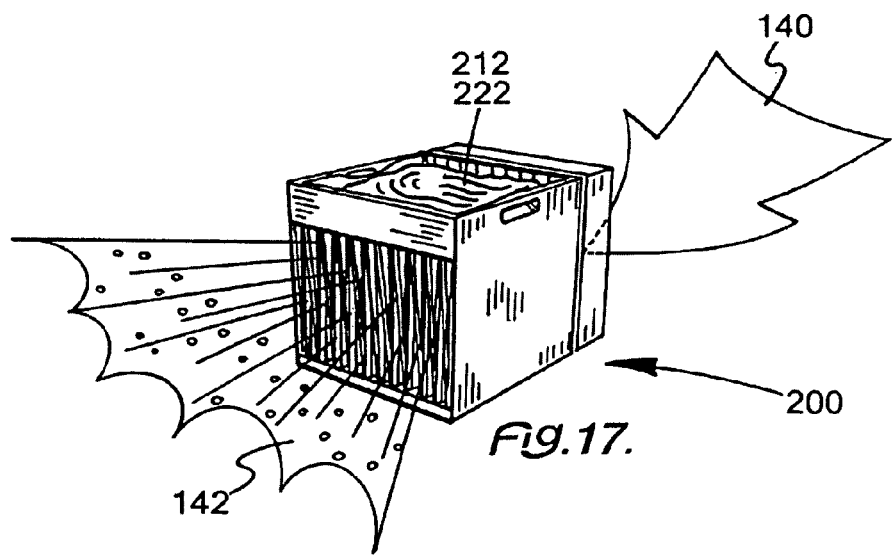
FIG. 17 depicts a perspective of the waste paint dryer 200 of this invention, in use.
Figure 18:
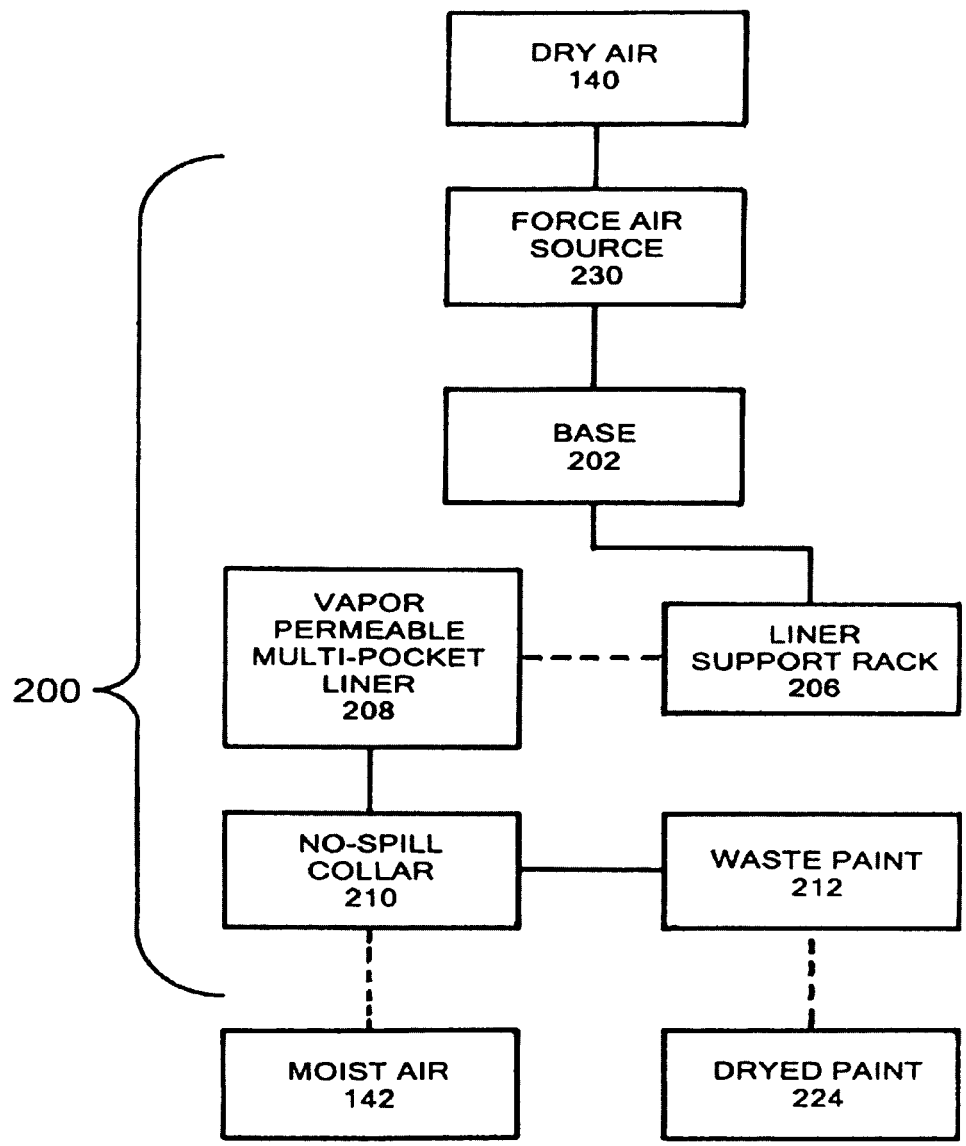
FIG. 18 depicts a block diagram of the waste paint dryer 200 of this invention.

Adding FIG. 16, FIG. 17 and FIG. 18 to the consideration, the use of waste paint dryer 200 becomes even more clear. Small box fan 114 fits at one end thereof. Blind handles 240 are in the sides of portable base 202, which are perpendicular to small box fan 114. While blind handles 240 are optional, they do facilitate handling of portable base 202. A pour 216 of waste paint 212 from paint can 220 into the supported vapor permeable, multi-pocket liner 208 leads to drying paint 222.

Small box fan 114 forces air through vapor permeable, multi-pocket liner 208 and hastens the conversion of waste paint 212 into drying paint 222.

Turning now to FIG. 18, waste paint dryer 200 includes the portable base 202 containing the liner support rack 206, with the vapor permeable, multi-pocket liner 208 therein. The vapor permeable, multi-pocket liner 208 extends into the upper collar 210. Waste paint 212 is poured therein passing the no spill collar. As forced air source 230 forces dry air 140 from one side of portable base 202 therethrough, moist air 142 comes out the other side of portable base 202, thereby forming dried paint 224.

Figure 21:
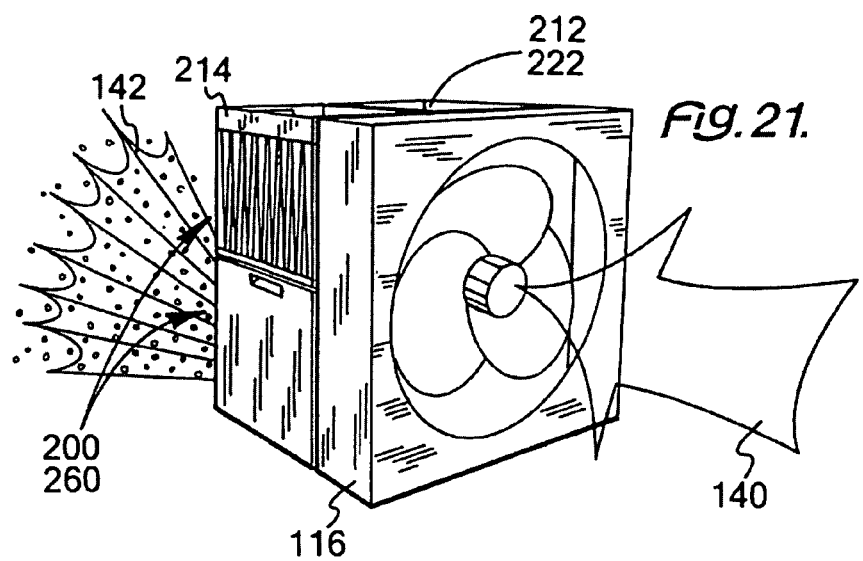
FIG. 21 depicts a perspective of the waste paint dryer 200 of this invention, in use.

FIG. 19, FIG. 20, and FIG. 21 combine to show a multi-functional use of waste paint dryer 200. In FIG. 19, a linear gang formation 250 has three and possibly more of waste paint dryer 200 lined up so that one small box fan can dry the waste paint 212 in all three waste paint dryers.

The clump formation 252 of FIG. 20 shows a stack of four waste paint dryers 200 formed into a square line up with successive squares of four waste paint dryers 200. To the first stack of four waste paint dryers 200 is applied large box fan 116, preferably of sufficient size, cover all members of the first stack of four waste paint dryers 200 and force dry air through the entire clump formation 252. The entire set up can be left to run for a long period of time, from hours to days as desired. Again the vapor permeable surface receiving the paint greatly facilitates the drying process and device.

For the accelerated drying formation 260 of FIG. 21 two of the stack of four waste paint dryers 200 can be rotated at a 90 degree angle 214, thereby permitting all of the air from large box fan 116 to pass through the bottom two of the four waste paint dryers 200. With greater air flow, drying of the waste paint 212 will be more rapid.

So at least one set of four waste paint dryers 200 for clump formation 252 can have air forced there through. Also, two of the four waste paint dryers 200 can be blocked to force more air through faster. The clump formations 252 thus has several uses.

The water in the moist air 142 can be recovered or allowed to evaporate. The drying paint 222 can be recovered and reused, or sent for disposal more easily. Such action greatly facilitates the handling of waste paint 212.

In the following examples, which are intended to illustrate without unduly limiting the scope of this invention, all parts and percentages are by unless otherwise indicated.

EXAMPLE 1

The assembly of tray paint dryer 100 is set with reference to FIG. 1. Onto a set of dryer tray 118 having a vapor permeable tray liner 122 is poured a water-based paint. The dryer trays 118 are inserted into dryer housing 110. Large box fan 116 is placed adjacent thereto and forces air therethrough. The paint dries in about 72 hours.

EXAMPLE 2

The procedure of Example 1 is repeated but for the replacement of vapor permeable tray liner 122 with a liner substantially lacking in vapor permeability. After one week the paint still is not dry.

EXAMPLE 3

The procedure of Example 1 is repeated but for the replacement of tray paint dryer 100, with the waste paint dryer 200 of FIG. 9. Vapor permeable, multi-pocket liner 208 serves as the vapor permeable surface. Small box fan 114 also replaces large box fan 116. Drying of the paint is accomplished in about 72 hours.

EXAMPLE 4

The procedure of Example 3 is repeated but for the replacement of vapor permeable, multi-pocket liner 208 with a liner substantially lacking in vapor permeability. After two weeks the paint still is not dry.

EXAMPLE 5

The procedure of Example 3 is repeated but for the alignment of three of the waste paint dryer 200 of FIG. 19. Drying of the paint is accomplished in about 72 hours and uses less energy per gallon dried.

EXAMPLE 6

The procedure of Example 5 is repeated but for the use of the clump formation 252 of FIG. 20 and the use of large box fan 116. Drying of the paint is accomplished in about 72 hours and uses less energy per gallon dried.

EXAMPLE 7

The procedure of Example 6 is repeated but for the use of the accelerated drying formation 260 of FIG. 21 and the use of large box fan 116. By blocking the top two of waste paint dryer 200 is accomplished in about 72 hours.

This application—taken as a whole with the abstract, specification, claims, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this tool can become clear to a person having ordinary skill in this particular art. Such modifications are clearly covered by this disclosure.

What is claimed and sought to be protected by Letters Patent is:

1. A paint disposal or recovery system for a water-based paint comprising:
   a paper surface being adapted to receive a layer of the water-based paint;
   a surface support for the paper surface;
   the water-based paint containing water and at least one material dispersed in the water;
   an evaporating means being adapted to remove the water in order to leave the at least one material on the paper surface;
   the at least one material becoming recoverable or disposable;
   a housing receiving the surface support with the paper surface thereon;
   the surface support being a liner support rack with a series of base slots therein;
   the paper surface being a paper, multi-pocket liner having a series of paint slots;
   the series of base slots including at least one base slot;
   the series of paint slots including at least one paint slot; and
   the at least one base slot receiving the at least one paint slot;
   the paper, multi-pocket liner being adapted to receive paint in the at least one paint slot;

the evaporating means being a small box fan; and the small box fan being positioned adjacent to the housing in order to force air through the housing thereby causing paint to dry as water evaporates;

an upper collar extending from and above the paper, multi-pocket liner;

the upper collar facilitating pouring of paint into the paper, multi-pocket liner; and the upper collar permitting a drying for at least one paint applicator;

the housing including a pair of handles to facilitate transportation thereof;

the pair of handles including a first blind handle and a second blind handle in opposing sides of the housing; and the opposing sides being perpendicular to the box fan;

a waste paint dryer including at least two waste paint dryers;

the at least two waste paint dryers being in a linear gang formation in order for one small box fan can dry all of the paint;

the air flow passing into the at least two waste paint dryers over the paint therein and then out of the at least two waste paint dryers.

2. A method of drying water based paint comprising:

spreading the water based paint on a paper surface to form drying paint;

passing a drying agent over the drying paint to remove water and leave solids from the water based paint; and recovering the solids;

supporting the paper surface before spreading the water based paint on the paper surface to form a supported surface;

using air as the drying agent;

placing the supported surface in a housing;

directing air through the housing;

recovering the solids includes recycling the solids or disposing of the solids; and the solids being in layers;

the paper surface being a liner support rack with a multi-pocket liner therein;

the liner support rack including a plurality of base slots;

the multi-pocket liner including a plurality of paint slots; and each base slot member of the plurality of base slots receiving a paint slot member of the plurality of paint slots; and forming a line of at least two of the housings;

passing air into the at least two housings over the paint therein and then out of the at least two housings.

3. The method of claim 2 further comprising:

a) recovering the solids includes recycling the solids;

b) pulverizing the paper surface with the solids for use in paint; and c) the solids being in layers.

* * * * *